(12) United States Patent
Laney et al.

(10) Patent No.: US 8,302,561 B2
(45) Date of Patent: Nov. 6, 2012

(54) TEAT CUP SHELL

(75) Inventors: Charles Jeffrey Laney, Navarre, OH (US); Frank Saho, III, Gnadenhutten, OH (US); Daniel E. Kandray, Sr., Gnadenhutten, OH (US)

(73) Assignee: Lauren Agrisystems, Ltd., New Philadelphia, OH (US)

( * ) Notice: Subject to any disclaimer, the term of this patent is extended or adjusted under 35 U.S.C. 154(b) by 431 days.

(21) Appl. No.: 12/539,174

(22) Filed: Aug. 11, 2009

(65) Prior Publication Data

US 2011/0036297 A1 Feb. 17, 2011

(51) Int. Cl.
*A01J 1/00* (2006.01)
(52) U.S. Cl. .................................................. 119/14.47
(58) Field of Classification Search .... 119/14.47–14.49; A01J 5/00, 5/04
See application file for complete search history.

(56) References Cited

U.S. PATENT DOCUMENTS

| | | | |
|---|---|---|---|
| 488,282 A | 12/1892 | Mehring | |
| 827,159 A * | 7/1906 | Lane | 119/14.49 |
| 1,000,948 A | 8/1911 | Ridd | |
| 1,201,808 A * | 10/1916 | Dinesen | 119/14.49 |
| 1,239,923 A * | 9/1917 | Leitch | 119/14.51 |
| 1,285,079 A | 11/1918 | Eklundh et al. | |
| 1,312,941 A | 8/1919 | Anderson | |
| 1,365,665 A | 1/1921 | Davies | |
| 1,620,916 A | 3/1927 | Pressell | |
| 2,073,737 A * | 3/1937 | Ellison | 119/14.49 |
| 2,079,435 A * | 5/1937 | Dinesen | 119/14.52 |
| 2,099,884 A | 11/1937 | Green | |
| 2,341,953 A | 2/1944 | Scott | |
| 2,402,094 A * | 6/1946 | Shurts et al. | 119/14.49 |
| 2,502,362 A | 3/1950 | Babson | |
| 2,986,117 A * | 5/1961 | Ronaldson | 119/14.38 |
| 2,997,980 A | 8/1961 | Noorlander | |
| 3,099,246 A | 7/1963 | Beskow | |
| 3,255,732 A | 6/1966 | Raht | |
| 3,308,788 A * | 3/1967 | Noorlander | 119/14.52 |
| 3,476,085 A | 11/1969 | Noorlander | |
| 3,482,547 A | 12/1969 | Maier | |
| 3,611,993 A | 10/1971 | Norton | |
| 3,659,558 A | 5/1972 | Noorlander | |
| 3,720,235 A | 3/1973 | Schrock | |
| 3,818,867 A * | 6/1974 | Strange-Hansen | 119/14.47 |
| 3,931,795 A | 1/1976 | Duncan | |
| 3,967,586 A | 7/1976 | Noorlander | |

(Continued)

FOREIGN PATENT DOCUMENTS

DE 1011212 6/1957

(Continued)

*Primary Examiner* — Richard Price, Jr.
(74) *Attorney, Agent, or Firm* — Zollinger & Burleson, Ltd.

(57) ABSTRACT

A teat cup shell for holding a milking liner includes a body being made from a first material. The body has an upper end, a lower end; and a middle portion with the upper end adapted to receive the teat of the animal being milked. One configuration of the body may have enlarged upper and lower ends to define a dog-bone shape. The middle portion of the body may define gripping features at its middle portion. The body of the shell has a first weight. An insert is carried by the body with the insert being heavier than the remaining portion of the body. The insert is disposed closer to the lower end of the body than the upper end of the body such that the center of mass of the shell is disposed in the lower two-thirds of the shell.

24 Claims, 12 Drawing Sheets

U.S. PATENT DOCUMENTS

| | | | |
|---|---|---|---|
| 3,967,587 A | | 7/1976 | Noorlander |
| 3,973,521 A | * | 8/1976 | Duncan ............... 119/14.47 |
| 4,196,696 A | | 4/1980 | Olander |
| 4,263,875 A | | 4/1981 | Maier |
| 4,303,038 A | | 12/1981 | Thompson |
| 4,324,201 A | | 4/1982 | Larson |
| 4,372,250 A | | 2/1983 | Larson |
| 4,393,811 A | | 7/1983 | Bodmin |
| 4,441,454 A | | 4/1984 | Happel |
| 4,530,307 A | | 7/1985 | Thompson |
| 4,572,106 A | | 2/1986 | Mills |
| 4,604,969 A | | 8/1986 | Larson |
| 4,745,881 A | | 5/1988 | Larson |
| 4,756,275 A | | 7/1988 | Larson |
| 4,869,205 A | | 9/1989 | Larson |
| 5,007,378 A | | 4/1991 | Larson |
| 5,069,162 A | | 12/1991 | Thompson |
| 5,080,041 A | | 1/1992 | Steingraber |
| 5,161,482 A | | 11/1992 | Griffin |
| 5,178,095 A | * | 1/1993 | Mein ............... 119/14.47 |
| 5,224,442 A | | 7/1993 | Davies |
| 5,482,004 A | | 1/1996 | Chowdhury |
| 5,572,947 A | | 11/1996 | Larson |
| 5,725,947 A | | 3/1998 | Johannsen |
| 5,752,462 A | | 5/1998 | Petersson |
| 5,765,599 A | | 6/1998 | Hernvall |
| 6,009,834 A | * | 1/2000 | Krone et al. ............... 119/14.47 |
| 6,039,001 A | | 3/2000 | Sanford |
| 6,055,931 A | | 5/2000 | Sanford, Jr. |
| 6,164,243 A | | 12/2000 | Larson |
| D447,840 S | | 9/2001 | Alveby |
| 6,308,655 B1 | | 10/2001 | Oosterling |
| 6,308,656 B1 | * | 10/2001 | Milbrath et al. ........... 119/14.47 |
| 6,427,624 B1 | | 8/2002 | Briggs |
| 6,435,132 B1 | | 8/2002 | Milbrath |
| 6,546,893 B1 | | 4/2003 | Happel |
| 6,588,364 B1 | | 7/2003 | Petterson |
| 6,631,694 B1 | | 10/2003 | Chowdhury |
| 6,640,744 B2 | * | 11/2003 | Lincke ............... 119/14.47 |
| 6,722,310 B1 | | 4/2004 | Alveby |
| D489,866 S | | 5/2004 | Brown |
| 6,742,475 B1 | | 6/2004 | McLeod et al. |
| 6,745,718 B1 | | 6/2004 | Chowdhury |
| 6,755,153 B1 | | 6/2004 | Chowdhury |
| 6,776,120 B1 | | 8/2004 | Chowdhury |
| 6,789,501 B2 | | 9/2004 | Brown |
| 6,796,272 B1 | | 9/2004 | Chowdhury |
| 6,857,389 B2 | | 2/2005 | Miller |
| 7,290,498 B2 | | 11/2007 | Shin |
| 7,293,527 B2 | | 11/2007 | Shin |
| 7,578,260 B2 | | 8/2009 | Shin |
| 7,856,942 B2 | * | 12/2010 | Pettersson et al. ......... 119/14.47 |
| 2004/0025794 A1 | | 2/2004 | Maier et al. |
| 2004/0060520 A1 | | 4/2004 | Sellner et al. |
| 2004/0094096 A1 | | 5/2004 | Fransen |
| 2005/0284379 A1 | | 12/2005 | Shin |
| 2006/0005772 A1 | * | 1/2006 | Shin ............... 119/14.52 |
| 2007/0012252 A1 | | 1/2007 | Gisslegard et al. |
| 2010/0326361 A1 | * | 12/2010 | Van Den Berg et al. ... 119/14.47 |

FOREIGN PATENT DOCUMENTS

| | | |
|---|---|---|
| EP | 1329155 | 7/2003 |
| EP | 1425959 | 6/2004 |
| FR | 1525716 | 5/1968 |
| KR | 10-1007842 | 10/2009 |

* cited by examiner

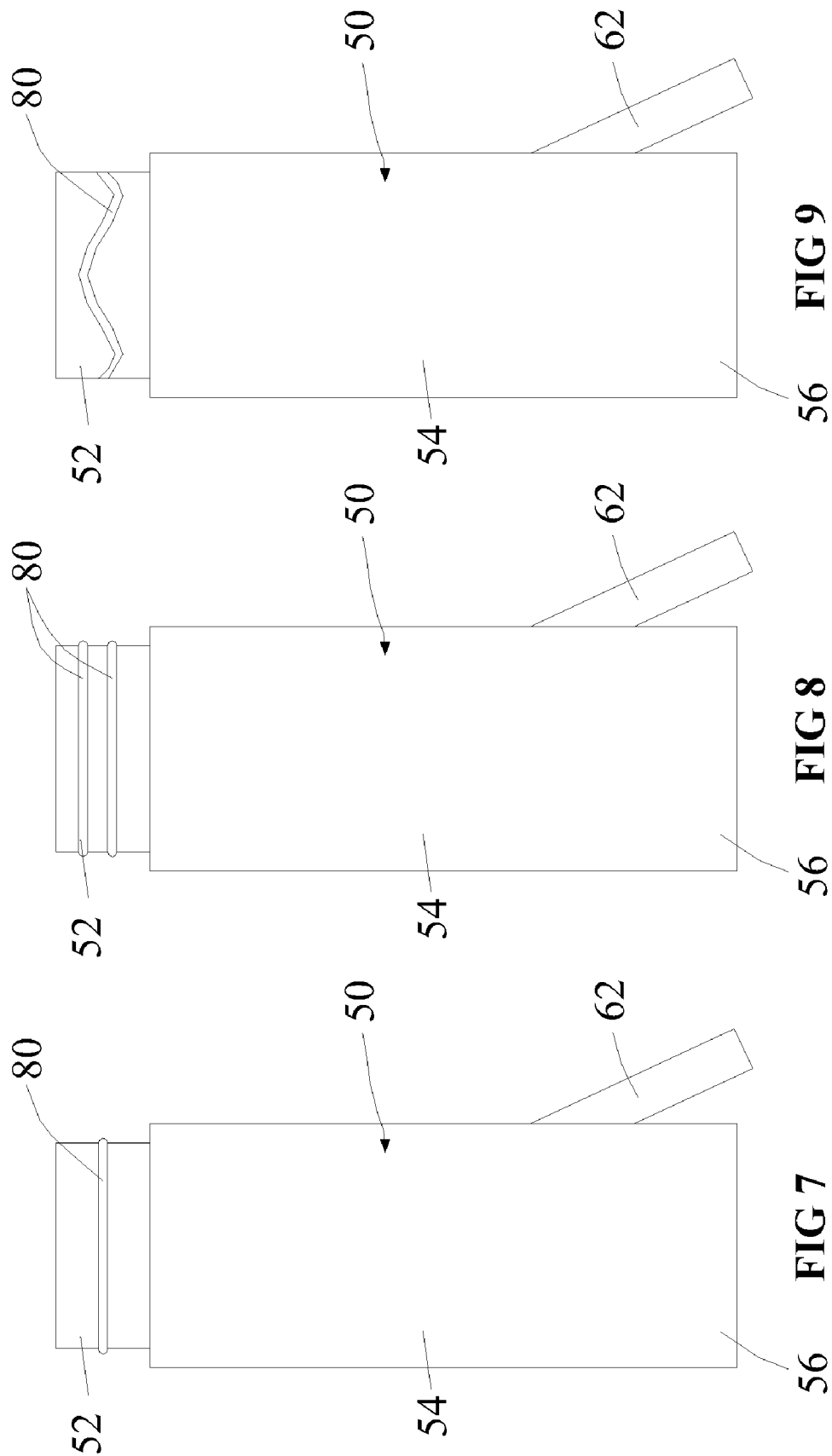

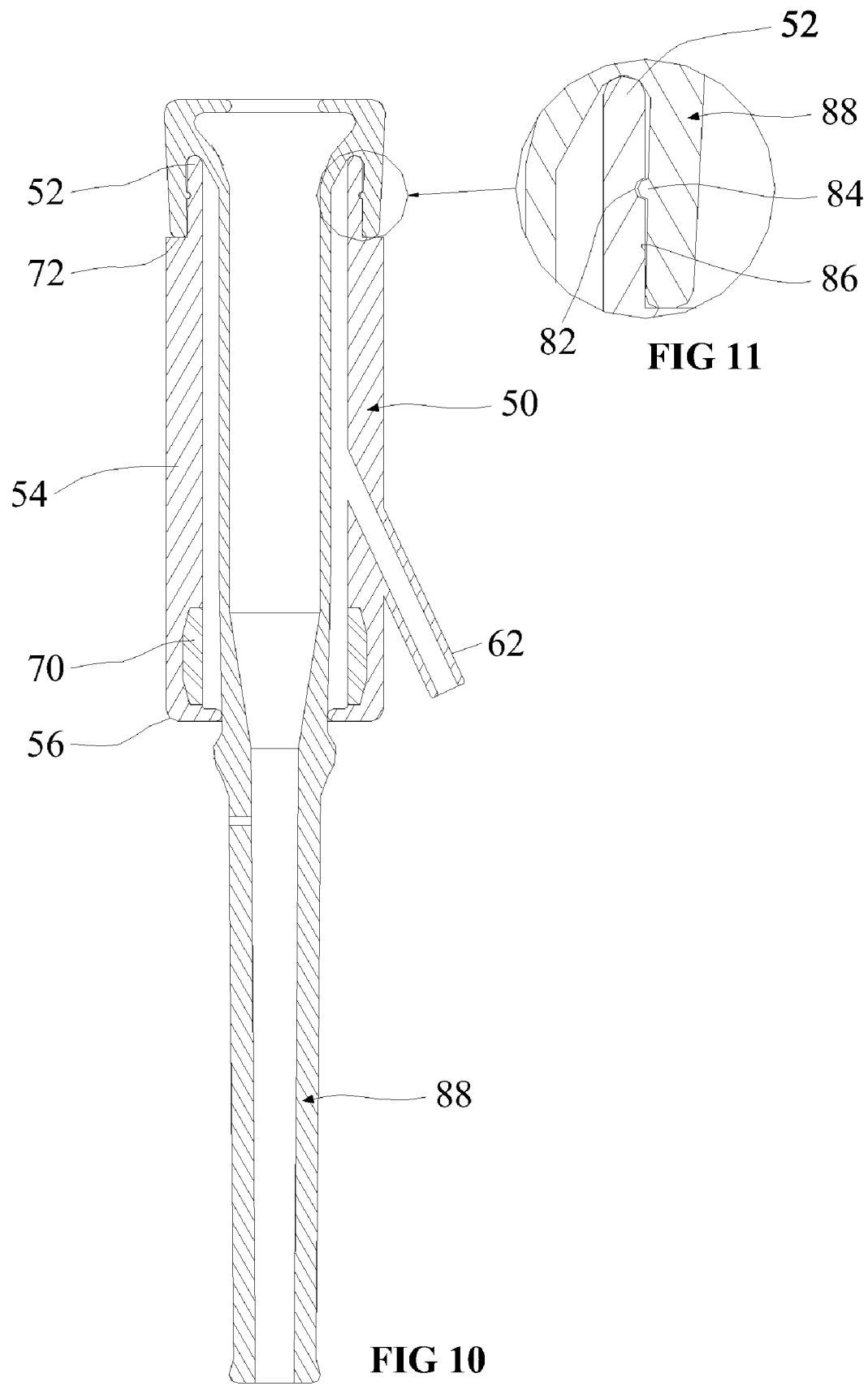

| Shell | Weight (grams) | | | % weight from insert | *Center of Mass of Shell and Weight (in.) | Length of Shell (in.) | C of M over half way point from top |
|---|---|---|---|---|---|---|---|
| | Insert | Shell | Total | | | | |
| Shell #50 | 120 | 75.1 | 195.1 | 61.5% | 4.098 | 5.75 | yes |
| LAS - 607 - all stainless steel, no added weight | - | 197.3 | - | | 2.839 | 5.563 | yes |
| Vision - weight at top | 20.6 | 129.6 | 150.2 | 13.7% | 2.500 | 6.25 | no |
| Impulse® - weight at top | 65.8 | 110.8 | 176.6 | 37.3% | 2.119 | 5.563 | no |
| Trimax - weight at top | 92.2 | 58.4 | 150.6 | 61.2% | 1.580 | 5.688 | no |
| Dairy Rite - weight at top | 146 | 68.6 | 214.6 | 68.0% | 1.555 | 6.75 | no |
| Durashell - weight in middle | - | - | 224.5 | | 2.365 | 5.688 | no |

*Center of Mass (C of M) is calculated by measuring from the top of the shell to the C of M.

FIG 20

TEAT CUP SHELL

BACKGROUND OF THE INVENTION

1. Technical Field

The invention relates to automatic milking apparatus and, more particularly, to the teat cup shells that hold the milking liners. Specifically, the invention relates to a bottom-weighted teat cup shell having ergonomic features and features that improve the seal between the shell and the milking liner.

2. Background Information

A typical teat cup shell is indicated generally by the numeral 2 in FIGS. 1-4. Teat cup shells 2 are typically made from metal or plastic. When made from plastic, shell 2 may include a metal feature that increases the weight of shell 2 as disclosed in U.S. Pat. Nos. 4,393,811 and 3,099,246 so that the overall weight of shell 2 is sufficient to pull down on the teats during the milking process. These teat cup shells seek to move the weight to the top of the shell or to spread the weight over as much of the shell as possible.

Teat cup shell 2 holds the milking inflation 4 that receives the animal's teat during the milking process. Shell 2 cooperates with liner 4 to define a vacuum chamber 6 that is subjected to a pulsating vacuum source controlled by a pulsator 8 as shown in FIG. 4. The vacuum applied to chamber 6 controls the application of liner 4 to the teat thus making the seal between liner 4 and shell 2 important to an efficient milking process. These seals also function to keep contamination out of chamber 6 to prevent pulsator 8 from being contaminated. A continuous vacuum is applied to the bottom of milking liner 4 through a milk hose 10. Milk that is extracted from the teat is removed from liner 4 through milk hose 10. A claw 12 (FIG. 3) is used to apply a vacuum to four teat cup assemblies and to consolidate the milk into a common milk hose. FIG. 3 depicts four teat cup assemblies connected to the teats of an udder.

When the user attaches the teat cup assemblies to the teats, the user is supposed to support claw 12 with one hand while positioning the teat cup assemblies on the teats with the other hand. The user is supposed to insert each teat in a liner in an even configuration so that liner 4 applies even pressure to the teat during the milking process. A teats cup assembly that is not properly placed will decrease the efficiency of the milking process by tilting away from the udder. The process of properly positioning the teat cup assemblies on the teats is difficult when the weather is cold and when the shells are wet. The users desire shells that are easy to hold in one hand while placing them on the teats under the animal.

SUMMARY OF THE INVENTION

The invention provides a teat cup for a teat cup assembly wherein the teat cup is configured to make the teat cup assembly hang in a more vertical position when in use on the teat.

In one configuration, the invention provides a teat cup shell for holding a milking liner; wherein the teat cup shell includes a body being made from a first material; the body having an upper end, a lower end; and a middle portion; the upper end adapted to receive the teat of the animal being milked; the body having a first weight; an insert carried by the body; the insert disposed closer to the lower end of the body than the upper end of the body; the insert having a second weight; and the second weight being greater than the first weight.

In another configuration, the weight and position of the insert is such that over sixty percent of the total weight of the teat cup is disposed in the bottom third of the teat cup shell.

The weight and position of the insert also may be configured to locate the center of mass of the teat cup shell in the bottom third of the teat cup shell.

The invention also provides a teat cup shell with gripping features that help the user hold the shell. In one configuration, the upper and lower ends of the shell are enlarged to provide abutment surfaces for the user's hand. Additional gripping features may be provided at the middle portion of the shell.

The invention further provides a teat cup shell configuration that has features that help the teat cup shell form a seal with the milking liner.

The invention provides one configuration wherein the upper end of the shell is configured with a shoulder that allows the liner to abut the shell in order to eliminate a protuberance that gathers liquid and debris.

The features described above may be used alone or together to form additional configurations for the teat cup shell.

BRIEF DESCRIPTION OF THE DRAWINGS

FIG. 7 is a side elevation view of a first configuration for the sealing bead disposed at the top of the teat cup shell.

FIG. 8 is a side elevation view of a second configuration for the sealing bead disposed at the top of the teat cup shell.

FIG. 9 is a side elevation view of a third configuration for the sealing bead disposed at the top of the teat cup shell.

FIG. 10 is a section view taken through a teat cup assembly having a sealing bead arrangement that is inversed from the configurations of FIGS. 7-9.

FIG. 11 is an enlarged view of the encircled portion of FIG. 10.

FIG. 20 is a chart comparing an exemplary configuration of a teat cup shell of the invention to six other existing shells.

Similar numbers refer to similar parts throughout the specification.

DETAILED DESCRIPTION OF INVENTION

Figure 1:
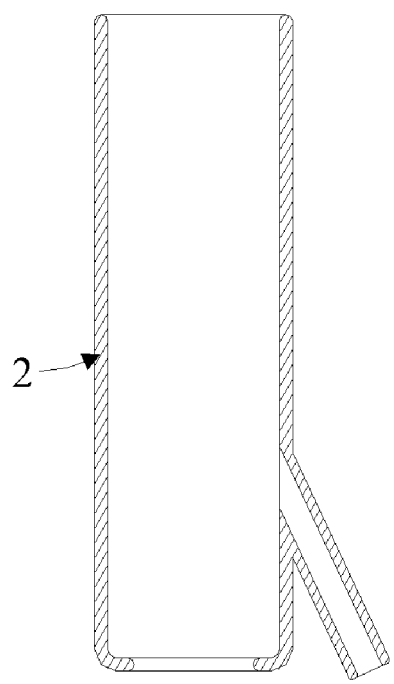
FIG. 1 is a section view taken through the length of a prior art teat cup shell.
Figure 2:
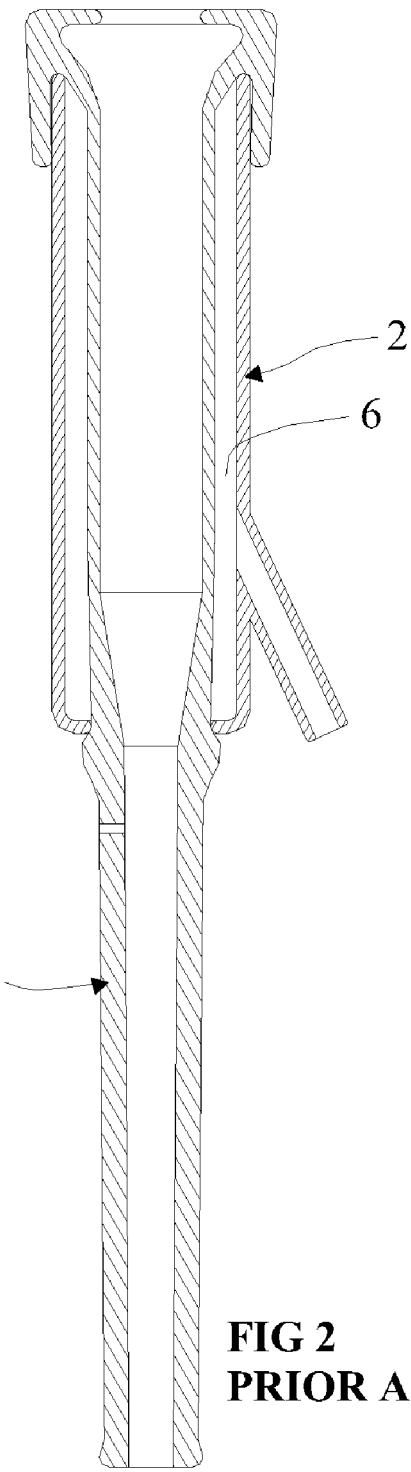
FIG. 2 is a section view taken through the length of a prior art milking liner inserted into the teat cup shell of FIG. 1 to form a teat cup assembly.
Figure 3:
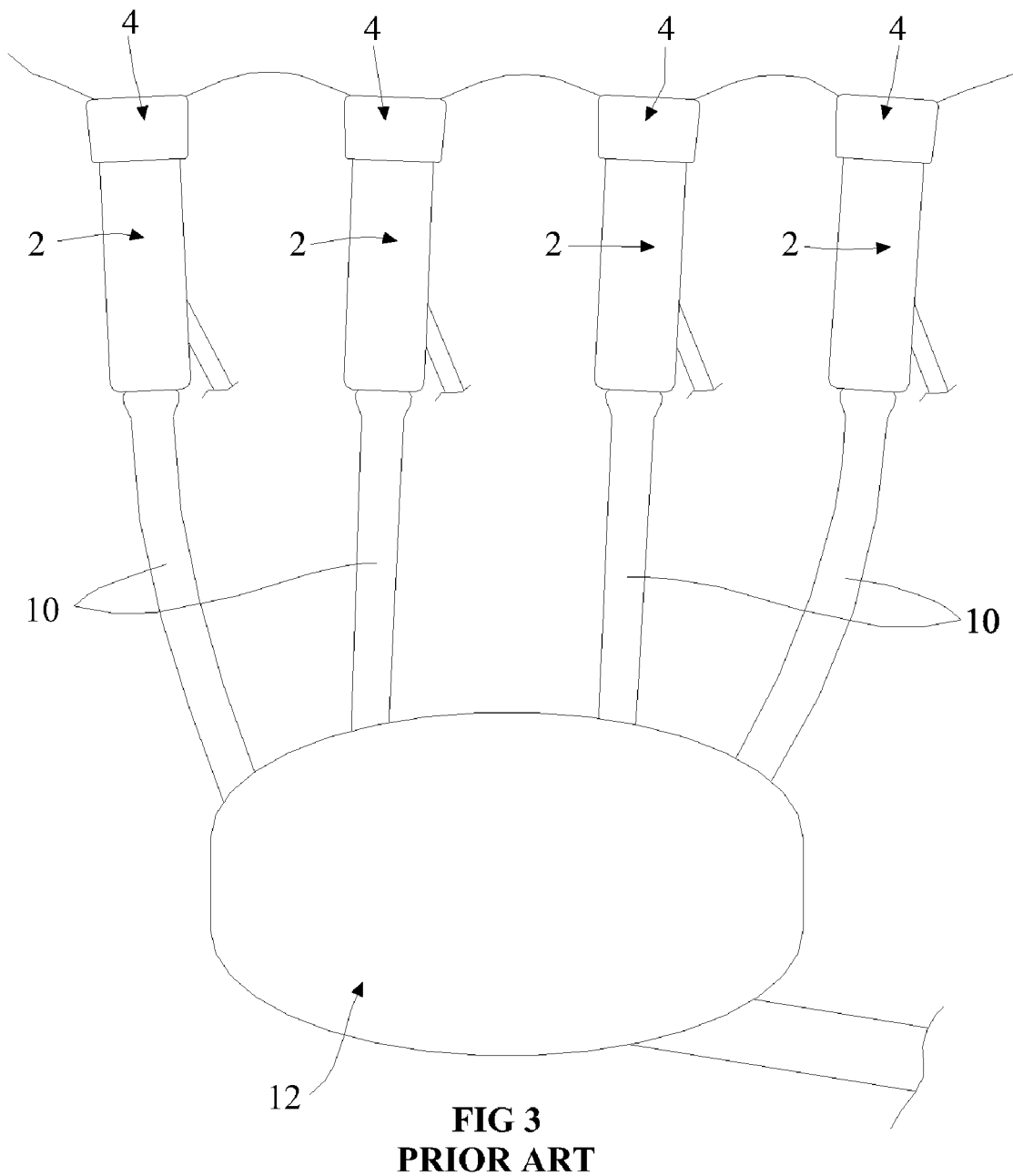
FIG. 3 is a schematic view of a prior art claw and teat cup portions of an automated milking apparatus.
Figure 4:
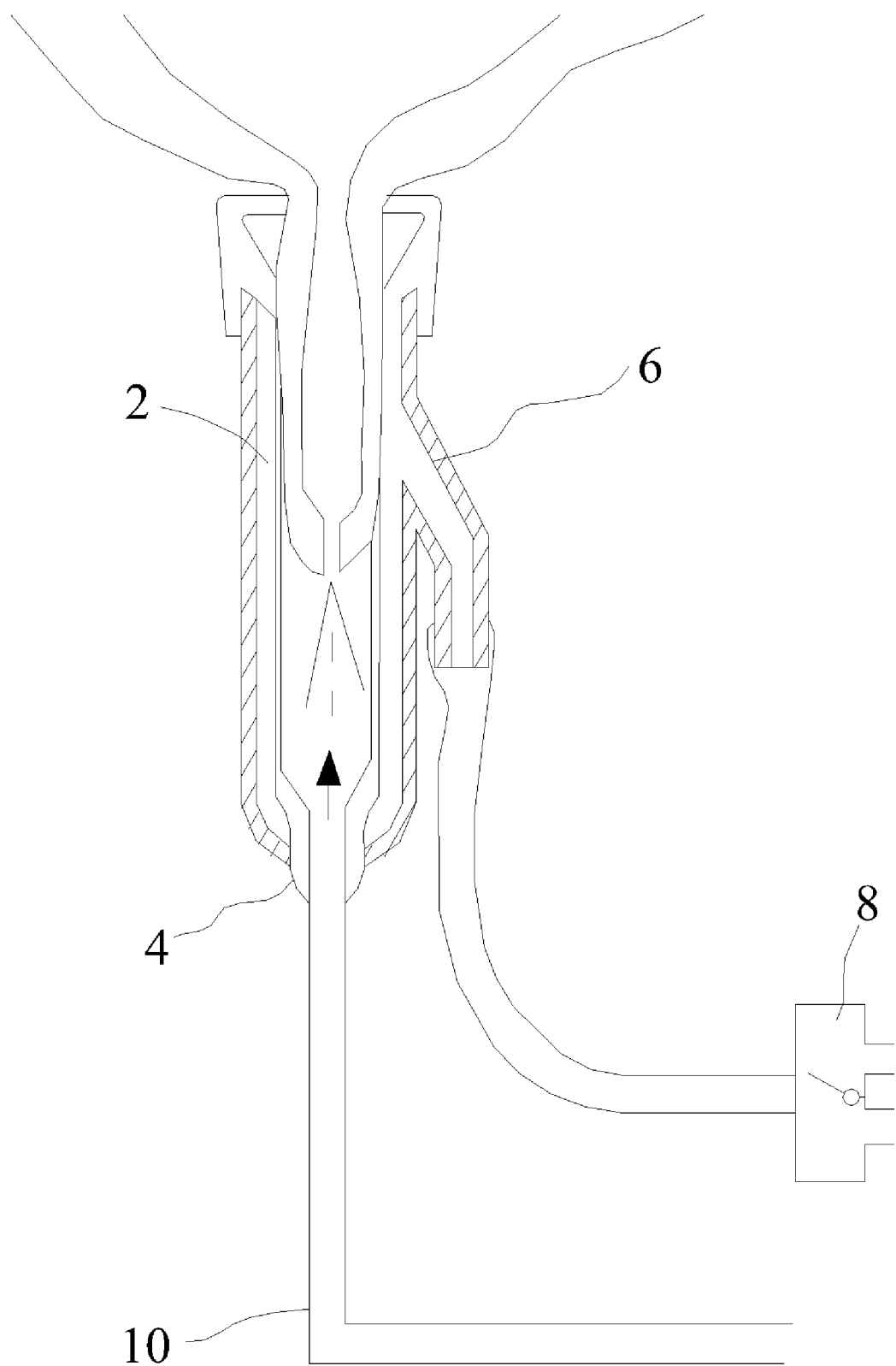
FIG. 4 is a section view taken through the length of a prior art teat cup assembly.
Figure 5:
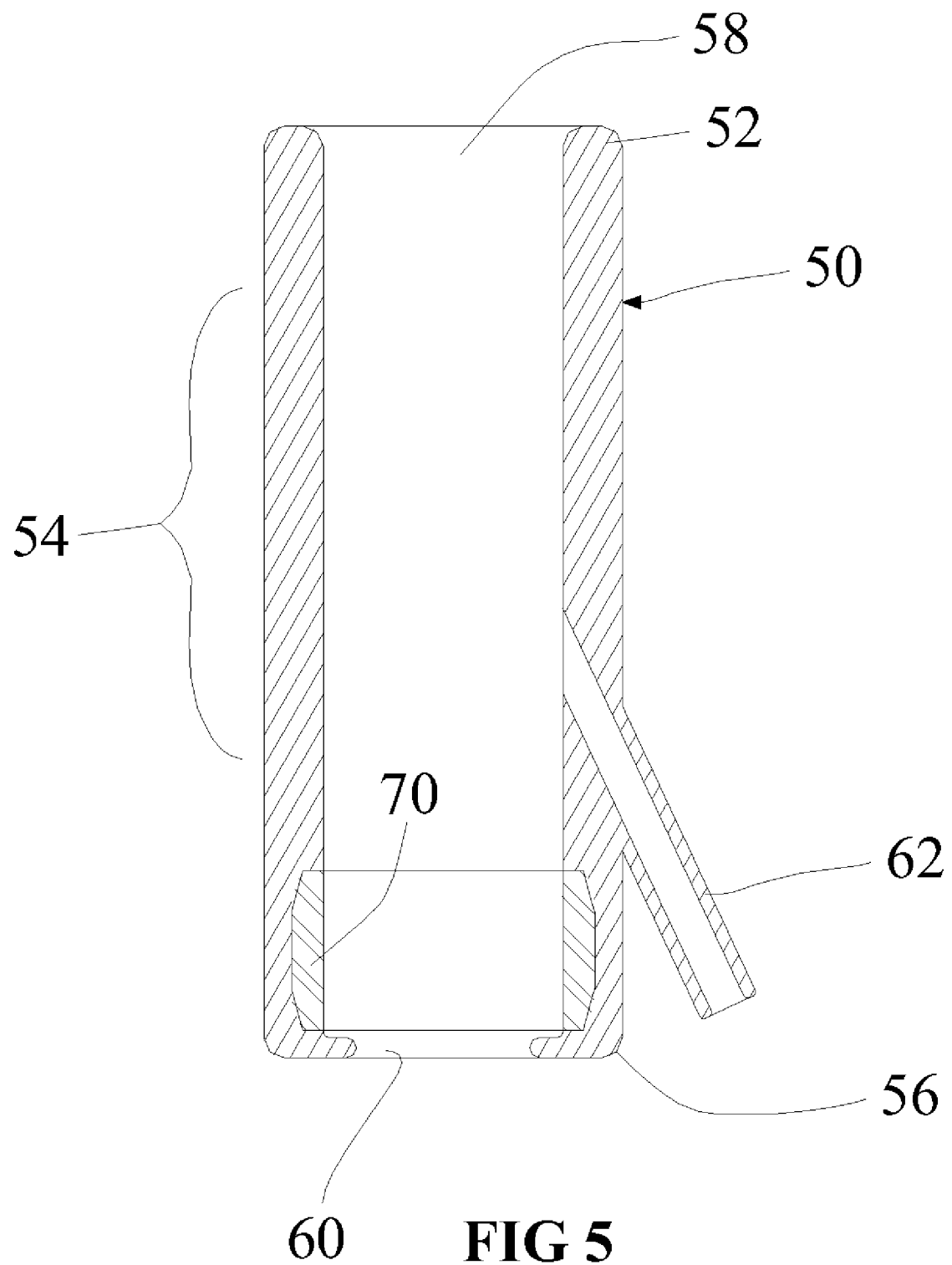
FIG. 5 is a section view taken through the length of an exemplary configuration of a bottom-weighted teat cup shell of the invention.
Figure 12:
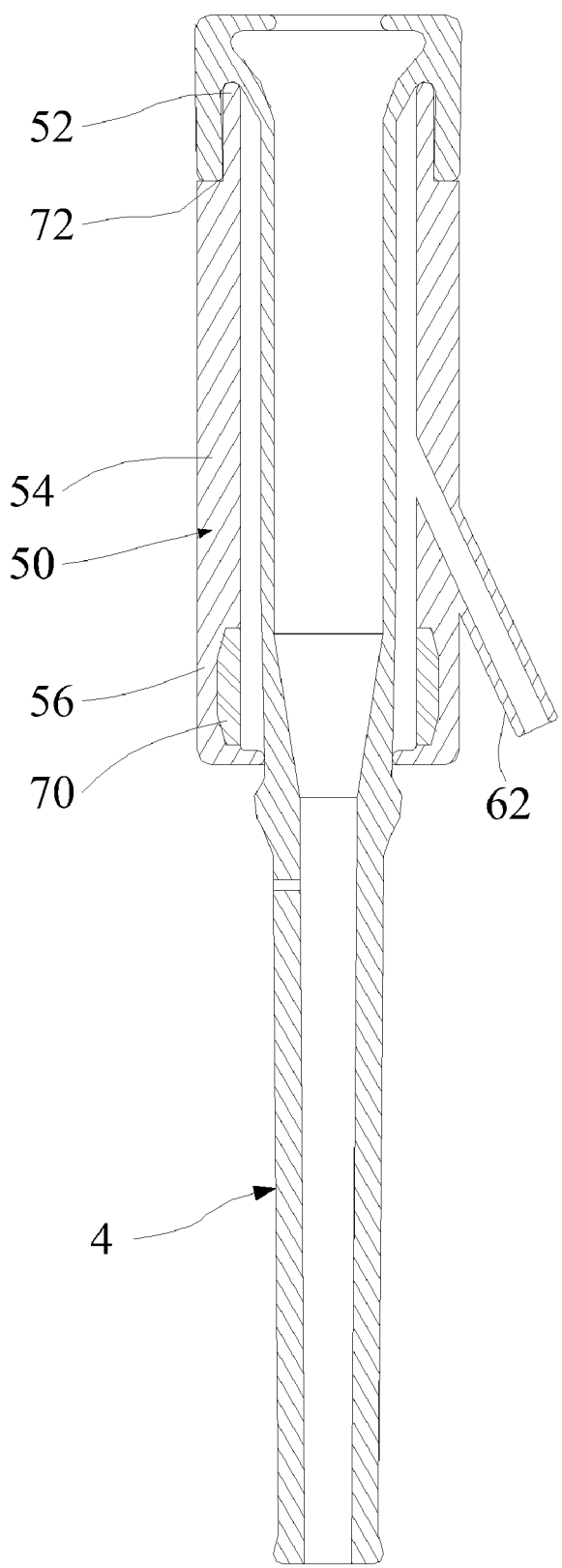
FIG. 12 is a section view taken through the length of another exemplary configuration of a teat cup shell.

One exemplary configuration of a bottom-weighted shell 50 is shown in FIG. 5. Shell 50 has a generally cylindrical body having an upper end 52, a middle portion 54, and a lower end 56. Shell 50 has a center of mass disposed in the lower third of the length of shell 50 towards lower end 56. An upper opening 58 is defined by upper end 52 and a lower opening 60 is defined by lower end 56. Upper opening 58 is configured to sealingly receive the upper end of a milking liner such as the configuration of liner 4 described above. Upper end 52 is the end of shell 50 configured to receive the animal's teat. The particular configuration of shell 50 may change when a different liner 4 is used with shell 50. The configurations depicted in the drawings are exemplary. In the exemplary configuration, lower opening 60 is smaller than upper opening 58 so that smaller opening 60 sealingly engages liner 4 as shown in FIG. 12. When shell 50 is used with other liner configurations, lower opening 60 may be larger than or the same size as upper opening 58. Shell 50 also includes a tube 62 that may be connected to the pulsating vacuum source described above. Moving a majority of the shell's weight to the lower portion of shell 50 improves the position of the teat cup assembly during the milking process and is believed to improve milking efficiency because of the more vertical position of the animal's teat.

Shell 50 is bottom-weighted with a majority of the shell's weight disposed in the bottom half of the shell's length. In one exemplary configuration, over sixty percent of the shell's weight is disposed in the bottom half of shell 50 such that the center of mass of shell 50 is disposed over two-thirds of the total length of shell 50 from upper end 52. Bottom weighting shell 50 in this manner is believed to be an important feature to increase the efficiency of the milking process by maintaining the teat cup assembly at a more vertical position while the teat cup assembly is attached to the teat. The relative position of bottom-weighted shell 50 and an upper weighted shell are shown for comparison purposes in FIGS. 6A and 6B wherein bottom-weighted shell 50 is more vertical than the top-weighted shell shown in FIG. 6B. A more vertical position is beneficial to the milking process especially with those teats that are not necessarily predisposed to hang vertically. Shell 50 of the invention hangs in a more vertical configuration because the majority of the shell weight and center of mass of shell 50 is disposed on a greater lever arm with respect to the connection between the teat cup assembly and the teat thus gives shell 50 an advantage over a top-weighted shell for moving to the straightened position. In the configuration described in FIG. 20, the center of mass of shell 50 is disposed over seventy percent of the body length from upper end 52. In the exemplary configurations, the center of insert 70 is located more than eighty-five percent of the shell body length from the top of the shell. Locating the center of mass of shell 50 this far from upper end 52 at the bottom of the shell is an important feature that pulls the teat cup assembly toward a vertical configuration when in use.

Figure 6A:
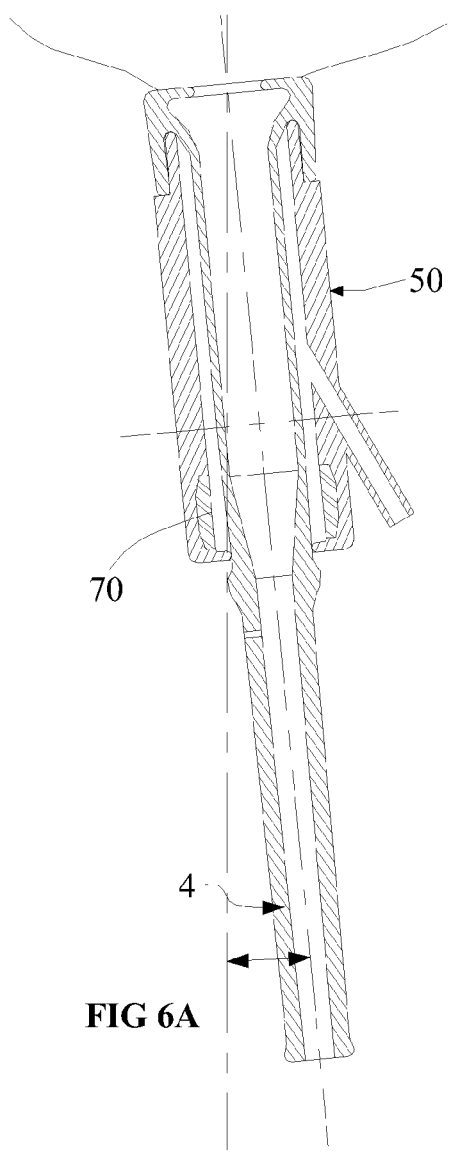
FIGS. 6A and 6B are section views taken through the length of two different teat cup assemblies showing how each positions the teat during milking.
Figure 6B:
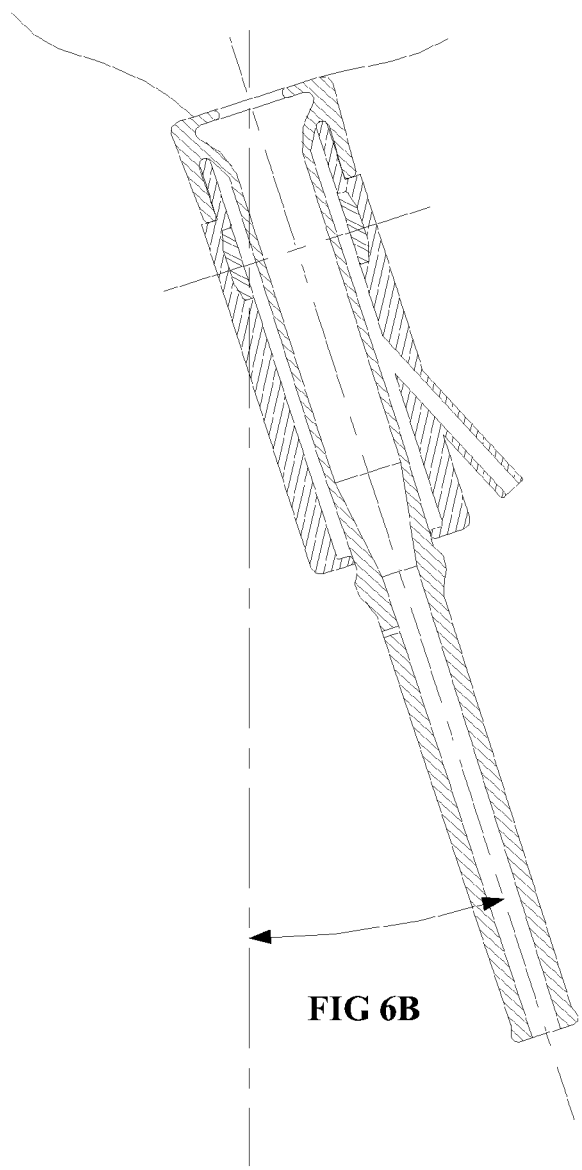

In the exemplary configuration, shell 50 is bottom-weighted through the inclusion of an insert 70 disposed just upwardly bottom end 56 of shell 50. Insert 70 may be a continuous ring 70 disposed below tube 62. The continuous ring insert 70 pulls evenly down on the molded body. Insert 70 is made from a material that is more dense than the material that forms the molded body. Insert 70 also may be in the form of a plurality of insert portions carried by the lower portion of the body of shell 50. Insert 70 may be disposed on the inside or outside of shell 50. In general, insert 70 is configured to be heavy enough to such that over sixty percent of the shell's weight is disposed in the bottom of shell 50. The body of shell 50 may be made from a moldable material such as a plastic and insert 70 may be made from a metal. The weight of the plastic portion of shell 50 is less or substantially less than the weight of insert 70. In one example, the molded body of shell 50 weights 75.1 grams while insert 70 weighs 120.0 grams (See FIG. 20). As such, insert 70 defines over sixty percent of the total weight (195.1 grams) of shell 50. The center of mass of the metal insert 70 is disposed over seventy-five percent of the shell's length from the top end of shell 50. Insert 70 may be added to the body after the body is molded and secured with a snap fit, an interference fit, a connector, or an adhesive. Insert 70 also may be loosely secured by the body so that insert 70 may move or rotate while being held within the molded body of shell 50. In the configuration of shell 50 shown in FIGS. 14 and 15, the body of shell 50 is formed by molding plastic over a metal ring 70 to secure metal ring 70 in place. The overmolding process results in a secure insert 70 such that shell 50 functions as a one-piece shell with no connectors or snap fits being required to hold insert 70 in place. The inner surface of metal ring 70 may be exposed to chamber 6 defined between shell 50 and liner 4 or insert 70 may be molded completely into the sidewall of the body. The molded body of shell 50 is a single integral piece that seals with liner 4. Positioning the majority of the total shell weight in the bottom portion of shell 50 helps straighten the teats as shown in FIG. 6A when a teat cup assembly formed with shell 50 is used to extract milk.

Figure 13:
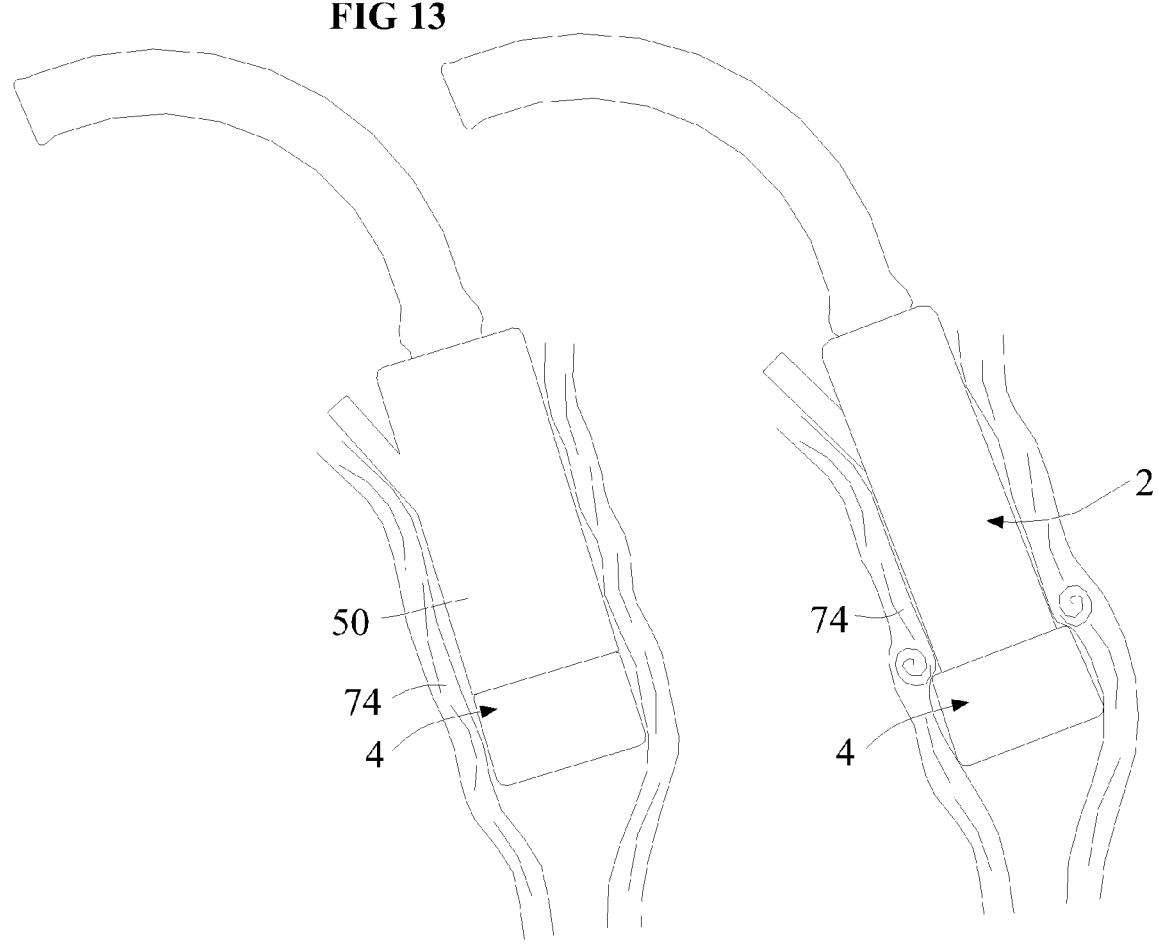
FIG. 13 is a schematic view comparing the teat cup assembly of FIG. 12 to the teat cup assembly of FIGS. 1 and 2 showing fluid flowing down their outer surfaces.

FIGS. 7-11 depict features that improve the seal between liner 4 and upper end 52 of shell 50. In these configurations, upper end 52 of shell 50 defines a shoulder 72 that offsets upper end 52 a distance inwardly from middle portion 54 substantially equal to the thickness of the upper end of liner 4 that is being positioned on upper end 54 such that there is a smooth transition between middle portion 54 and liner 4 at the top of the assembly. The use of shoulder 72 to form this smooth transition eliminates a gathering point for water 74 or debris that may run down the side of shell 50 as understood by comparing the two views of FIG. 13. Shells 50 hang upside down as shown in FIG. 13 from time to time when they are not connected to the animal's teats. The configuration of shell 50 having shoulder 72 eliminates a gathering point for liquid and debris. Another sealing feature is the sealing beads 80 of FIGS. 7-9 that project outwardly from upper end 52 to engage the inner surface of liner 4 that is slipped over upper end 52 to form the seal. FIG. 7 depicts a single, continuous about the perimeter, outwardly projecting sealing bead 80. FIG. 8 depicts first and second sealing beads 80 that are continuous about the perimeter of upper end 52 while being parallel to one another. FIG. 9 depicts a sinusoidal sealing bead 80. The sinusoidal shape may be random or non-uniform. Beads 80 that project outwardly from upper end 52 are small enough to be tightly-received by the resilient material of liner 4. FIGS. 10 and 11 depict an inverse sealing bead arrangement wherein upper end 52 defines a continuous recess 82 that receives a sealing bead 84 that projects inwardly from the inner surface 86 of the upper end of the milking liner 88.

Figure 14:
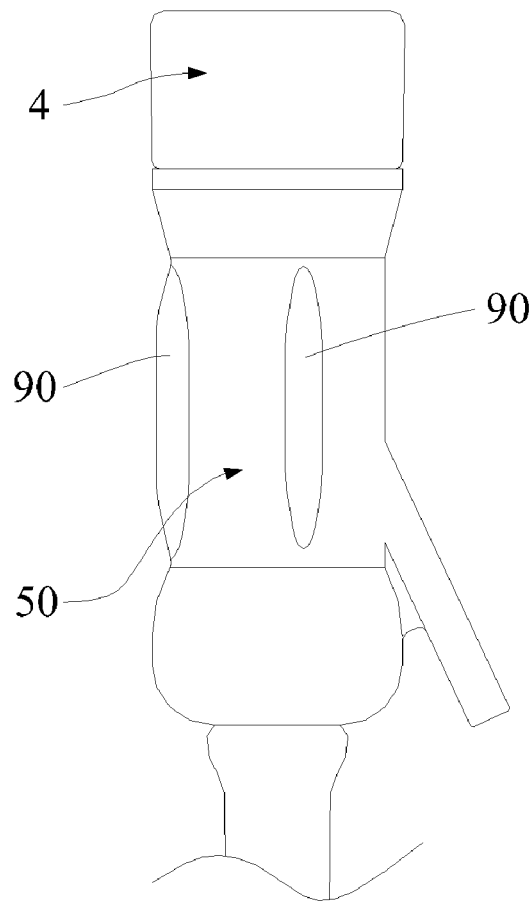
FIG. 14 is a side elevation view of another exemplary teat cup shell.
Figure 15:
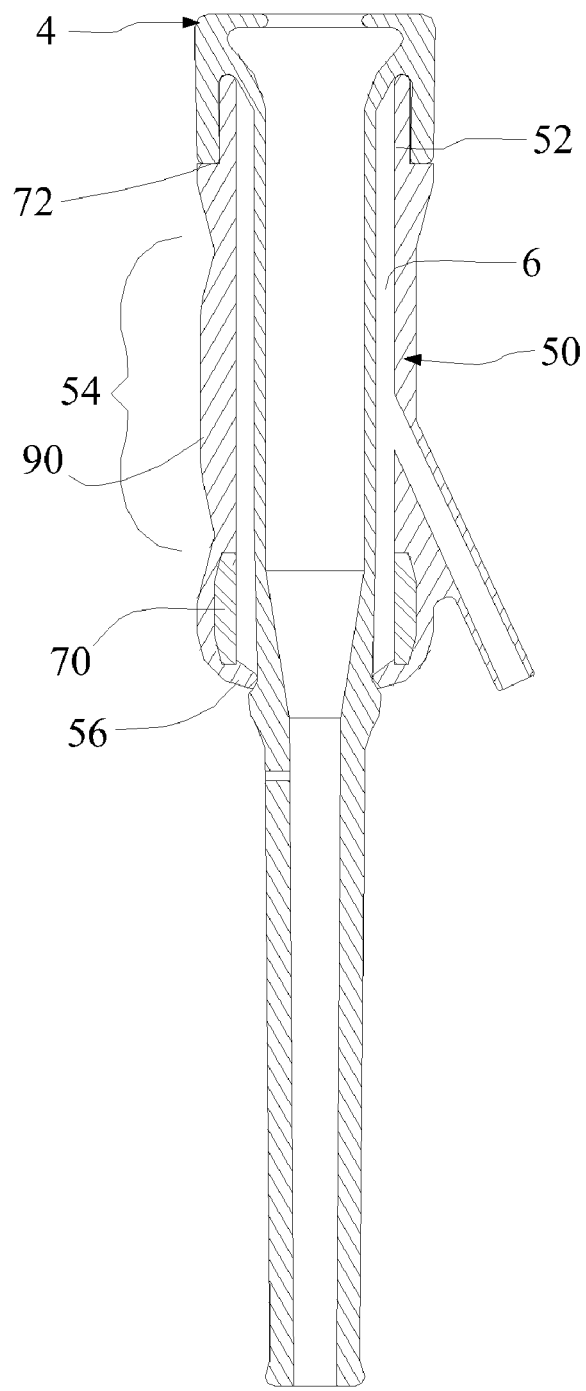
FIG. 15 is a section view of the assembly of FIG. 14.

FIGS. 14 and 15 depict an exemplary configuration for shell 50 wherein shell 50 is generally dog-bone in shape in that shell 50 has upper and lower end portions that have enlarged diameters or enlarged thicknesses compared to the middle portion 54. These enlarged ends define abutments for the user's hand that assist the user in holding shell 50. The enlarged diameter end portions allow shell 50 to fit into the user's hand and provide sloping abutments in both directions for abutting the user's hand. Such abutments improve the user's ability to handle shell 50 when shell 50 is wet or when shell 50 is cold because the ends of shell 50 will rest against top or bottom of the user's hand when gripped at the middle. The enlarged end portions make it easier for the user to properly position the liner on the teat. Insert 70 is contained within the lower enlarged portion as shown in FIG. 15 with insert 70 disposed entirely below tube 62

Figure 16:
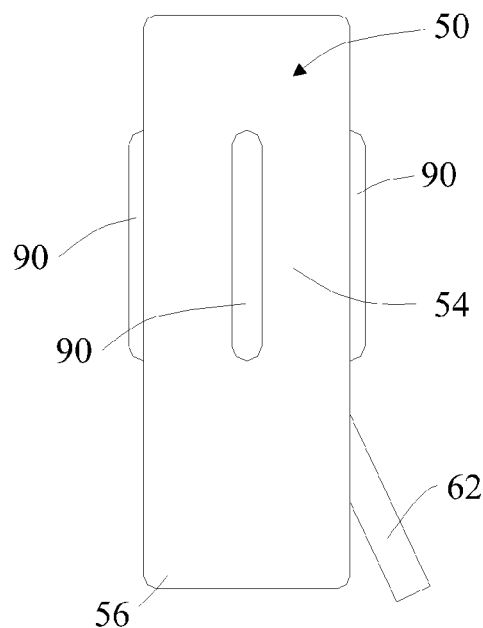
FIGS. 16-19 are side elevation views of different teat cup shells having gripping features.
Figure 17:
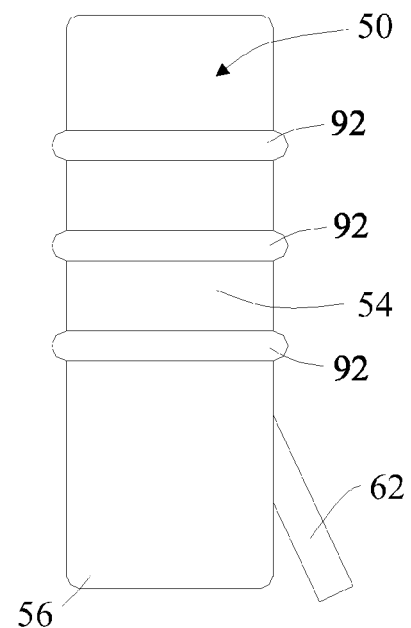
Figure 18:
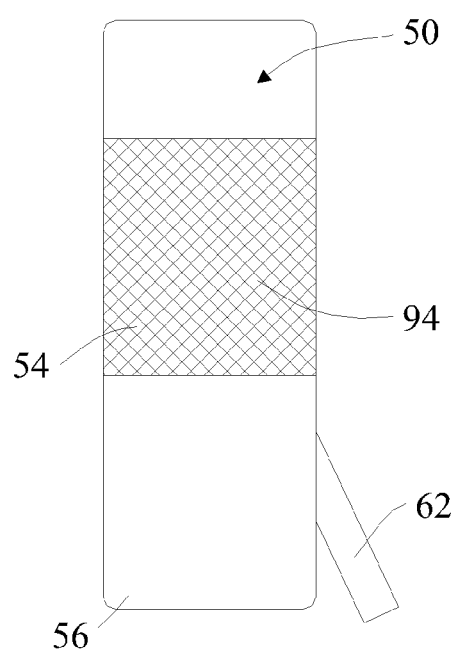
Figure 19:
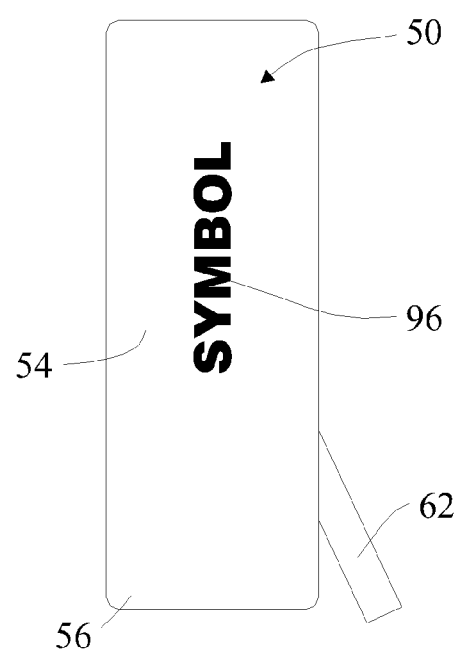

In addition to the enlarged upper and lower end portions, shell 50 may include grips or gripping features such as the longitudinal ribs 90 depicted in FIGS. 14-16, the ring-shaped ribs 92 of FIG. 17, the textured or knurled gripping surface 94 of FIG. 18, or the raised letters or symbols 96 of FIG. 19. In the configuration of FIGS. 14-15, the upper and lower end of ribs 90 taper down and extend only across middle portion 54 of shell 50. Gripping features 90, 92, 94, and 96 may be combined on a single shell 50 to improve the grip of shell 50.

While illustrative embodiments have been shown and described in detail, the invention may be embodied otherwise. The following claims should not be construed as being limited to the few embodiments set forth above.

The invention claimed is:

1. A teat cup shell for holding a milking liner; the teat cup shell comprising:
    a body being made from a first material; the body having an upper end, a lower end; and a middle portion; the upper end adapted to receive the teat of the animal being milked; the body having a first weight;
    a pulsation tube connected to the body: the pulsation tube adapted to be connected to a pulsating vacuum source;
    an insert carried by the body; the insert disposed closer to the lower end of the body than the upper end of the body; the insert disposed between the lower end of the body and the pulsation tube; the insert having a second weight; and
    the second weight being greater than the first weight.

2. The teat cup shell of claim 1, wherein the insert is in the form of a continuous ring disposed adjacent the lower end of the body.

3. The teat cup shell of claim 1, wherein the sidewall of the body defines a shoulder; the area of the sidewall disposed above the shoulder and below the upper end of the defining a sealing surface.

4. The teat cup shell of claim 3, further comprising a first sealing bead projecting outwardly from the sealing surface; the sealing bead extending about the entire outer perimeter of the sealing surface.

5. The teat cup shell of claim 4, wherein the first sealing bead is sinusoidal.

6. The teat cup shell of claim 4, further comprising a second sealing bead projecting outwardly from the sealing surface; the second sealing bead extending about the entire outer perimeter of the sealing surface; and the second sealing bead being spaced from the first sealing bead.

7. The teat cup shell of claim 6, wherein the second sealing bead is parallel to the first sealing bead.

8. The teat cup shell of claim 3, wherein the sealing surface defines a recessed sealing bead that extends about the entire perimeter of the sealing surface.

9. The teat cup shell of claim 8, further comprising gripping ribs projecting outwardly from the middle portion of the body.

10. The teat cup shell of claim 9, wherein the body has a longitudinal length; the gripping ribs being disposed generally parallel to the longitudinal length of the body.

11. The teat cup shell of claim 9, wherein the gripping ribs are disposed generally perpendicular to the longitudinal direction of the body and encircle the body.

12. The teat cup shell of claim 1, wherein the upper and lower ends of the body are wider than the middle portion of the body to give the body a generally dog-bone shape.

13. The teat cup shell of claim 12, wherein the middle portion of the body is textured.

14. The teat cup shell of claim 12, wherein the middle portion of the body defines a series of raised gripping features.

15. The teat cup shell of claim 14, wherein the material of the body is a non-metal material and the material of the insert is a metal.

16. The teat cup shell of claim 1, wherein the insert is fabricated from a material that is more dense than the material of the body.

17. The teat cup shell of claim 1, wherein the second weight is over 60 percent of the combined first and second weights.

18. The teat cup shell of claim 1, wherein the body has a length and the center of insert is disposed over seventy-five percent of the length of the body from the upper end of the body.

19. The teat cup shell of claim 1, wherein the body has a length and the center of mass of the combined body and insert is disposed over two-thirds of the body length from the upper end.

20. A teat cup shell for holding a milking liner; the teat cup shell comprising:
    a body being made from a first material; the body having an upper end, a lower end; and a middle portion; the body having a length defined between the upper and lower ends; the upper end adapted to receive the teat of the animal being milked; the body having a first weight;
    the body having enlarged upper and lower ends that define abutment surfaces for the user's hand;
    an insert carried by the body; the insert having a center of mass; the center of mass of the insert being disposed over seventy-five percent of the length of the body from the upper end of the body;
    the insert having a second weight that is greater than the first weight; and
    the center of mass of the combined body and insert being disposed over two-thirds of the body length from the upper end.

21. The teat cup shell of claim 20, further comprising gripping features extending outwardly from the middle portion of the body.

22. The teat cup shell of claim 20, wherein the insert is in the form of a continuous ring disposed adjacent the lower end of the body.

23. The teat cup shell of claim 20, wherein the insert is in the form of a plurality of insert portions.

24. The teat cup shell of claim 1, wherein the insert is in the form of a plurality of insert portions.

* * * * *